US006820641B2

(12) United States Patent
Larsen

(10) Patent No.: US 6,820,641 B2
(45) Date of Patent: Nov. 23, 2004

(54) INTERNALLY PILOTED DOME LOADED REGULATOR

(75) Inventor: Todd W. Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 40 days.

(21) Appl. No.: 10/264,566

(22) Filed: Oct. 4, 2002

(65) Prior Publication Data

US 2004/0065368 A1 Apr. 8, 2004

(51) Int. Cl.[7] .............................................. G05D 16/16
(52) U.S. Cl. .............. 137/491; 137/116.5; 137/115.23; 137/489.5; 137/492.5; 137/505.11; 251/28
(58) Field of Search ........................ 137/115.23, 116.5, 137/489, 489.5, 491, 492.5, 505.11; 251/28

(56) References Cited

U.S. PATENT DOCUMENTS

| | | | | |
|---|---|---|---|---|
| 1,184,761 A | * | 5/1916 | Lytton ..................... | 137/489.5 |
| 2,047,101 A | * | 7/1936 | Grove ..................... | 137/505.37 |
| 2,851,564 A | * | 9/1958 | Zimmerman ............. | 200/83 Q |
| 2,879,792 A | * | 3/1959 | Spence ..................... | 137/489.5 |
| 2,894,526 A | | 7/1959 | Booth et al. | |
| 2,963,040 A | | 12/1960 | Zimmer | |
| 3,357,443 A | * | 12/1967 | Brumm ..................... | 137/116.5 |
| 3,495,619 A | * | 2/1970 | Ilzumi ..................... | 137/489.5 |
| 3,586,037 A | | 6/1971 | Zimmer | |
| 3,754,730 A | * | 8/1973 | Nilles et al. ................. | 251/28 |
| 4,860,788 A | * | 8/1989 | Asaoka ..................... | 137/491 |
| 4,966,183 A | * | 10/1990 | Williamson, Jr. .......... | 137/116.5 |
| 4,967,783 A | | 11/1990 | Loos | |
| 5,002,087 A | * | 3/1991 | Feild ..................... | 137/489 |
| 6,058,962 A | | 5/2000 | Hayashi et al. | |

* cited by examiner

Primary Examiner—Ramesh Krishnamurthy
(74) Attorney, Agent, or Firm—Clayton R. Johnson

(57) ABSTRACT

The internally piloted dome loaded pressure reducing regulator includes a regulator body with a main valve portion and a pilot valve portion. The inlet is fluidly connected to the main valve bore which in turn is connected to the pilot valve bore. Each of the pilot and main valve members are spring urged to a closed position while the pilot valve is moved to an open position by a diaphragm when there is a decrease of pressure in the pilot chamber. A continuous fluid connection is provided from the pilot chamber, including through the main valve member, to a control chamber portion below a piston which is moved under pressure to open the main valve member. The piston has a bleed hole bottom chamber portion to the top control portion which in turn is fluidly connected to the outlet.

16 Claims, 3 Drawing Sheets

INTERNALLY PILOTED DOME LOADED REGULATOR

BACKGROUND OF THE INVENTION

This invention is for a pressure reducing regulator that includes a pilot regulator mechanism.

U.S. Pat. No. 2,963,040 to Zimmer discloses a dome type regulator valve having an inlet fluidly connected to a main valve chamber with a main valve extending therein, the inlet also being connected by valve bores to a second valve chamber with there being a second valve for controlling flow thereto. A passage fluidly connects the second valve chamber to have fluid pressure act against a pressure plate and therethrough, against a diaphragm and a piston. When the piston moves downwardly, it opens the main valve to allow fluid flow to the outlet.

In U.S. Pat. No. 4,967,783 to Loos there is disclosed a recirculation valve with a pilot valve wherein there is a valve stem for controlling fluid flow from the inlet port to a recirculation (outlet) port. Inlet fluid flows to the interior of a sleeve having valve seats, a first valve stem being axially movable within the sleeve between open and closed positions relative to the valve seats. Fluid also flows from the inlet to a gap between the central shaft and a throat to a chamber that opens to the top closed end of the sleeve. A tubular pilot valve stem opens to the chamber, is slidably extended with the first valve stem and opens to a pilot valve chamber in the lower end of the first valve stem. The enlarged end of the pilot valve stem is abuttable against a valve seat to block fluid flow to the recirculation port. When fluid pressure in the piston chamber builds up, the first valve stem is moved to block fluid flow from the inlet to the recirculation port.

In order to make improvements in dome loaded pressure reducing regulators, this invention has been made.

SUMMARY OF THE INVENTION

The dome loaded pressure reducing regulator includes a regulator body that, together with a dome, form a control chamber having a piston therein. A main valve in a closed position blocks flow from the inlet to the top portion of the control chamber while, when the pressure in the top portion decreases relative to the pressure in the bottom portion, the piston moves to in turn move the main valve member to an open position to increase the pressure above the piston. A pilot valve in a closed position blocks fluid flow from the main valve bore to the pilot chamber while, when the pressure in the pilot chamber decreases, a diaphragm flexes to move the pilot valve member to permit fluid flow from the main valve bore to the pilot chamber regardless of the main valve member being in its open position or its closed position. The pilot chamber is in constant fluid communication with the outlet, including through bores in the main valve member and the piston to the control chamber below the piston and a bleed hole in the piston.

One of the objects of this invention is to provide a pressure reducing regulator having new and novel means for pilot regulation and dome loaded supply regulation in one regulator body. Another object of this invention is to provide a new and novel dome loaded portion in a pressure reducing regulator to minimize pressure decay due to flow increases. Still another object of this invention is to provide new and novel means in a dome pressure reducing regulator for venting pilot pressure downstream of the pressure flow through the main valve of the regulator. A different object of this invention is to provide new and novel means in a dome loaded supply reducing regulator to enable minimizing hysterises of static conditions for making pilot regulation a dynamic regulating valve.

Even though, for convenience terms, such as "upper", "lower", "top" and "bottom" will be used in describing the pressure regulator, it is to be understood the usage of these terms is applicable to when the pressure regulator is in an upright position such as illustrated. However, it is to be further understood that the pressure regulator may be used in other than an upright position.

DESCRIPTION OF THE PREFERRED EMBODIMENT

Figure 1:
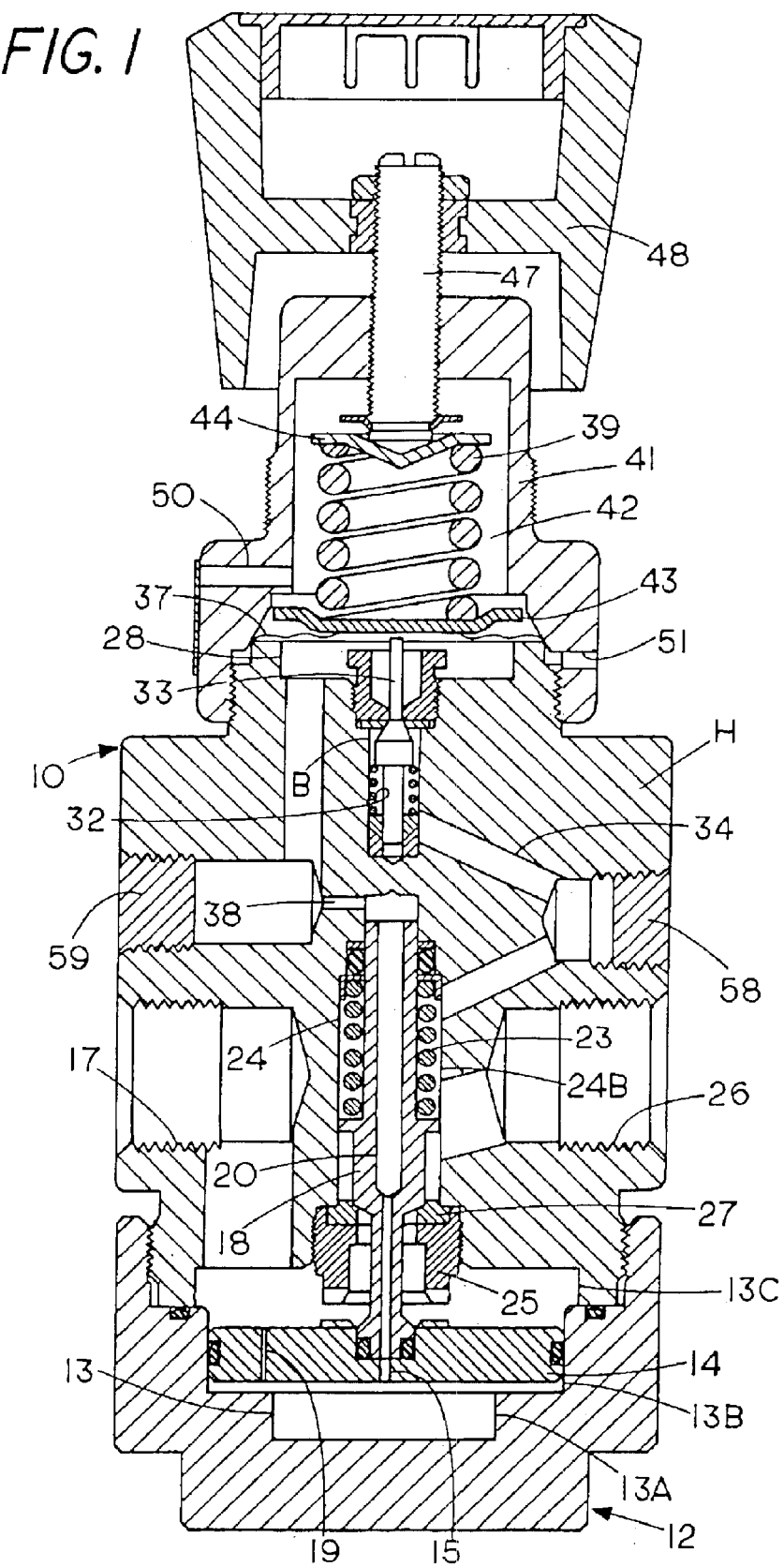
FIG. 1 is a cross sectional view of the pressure regulator apparatus of this invention in its closed position for blocking fluid flow therethrough.
Figure 2:
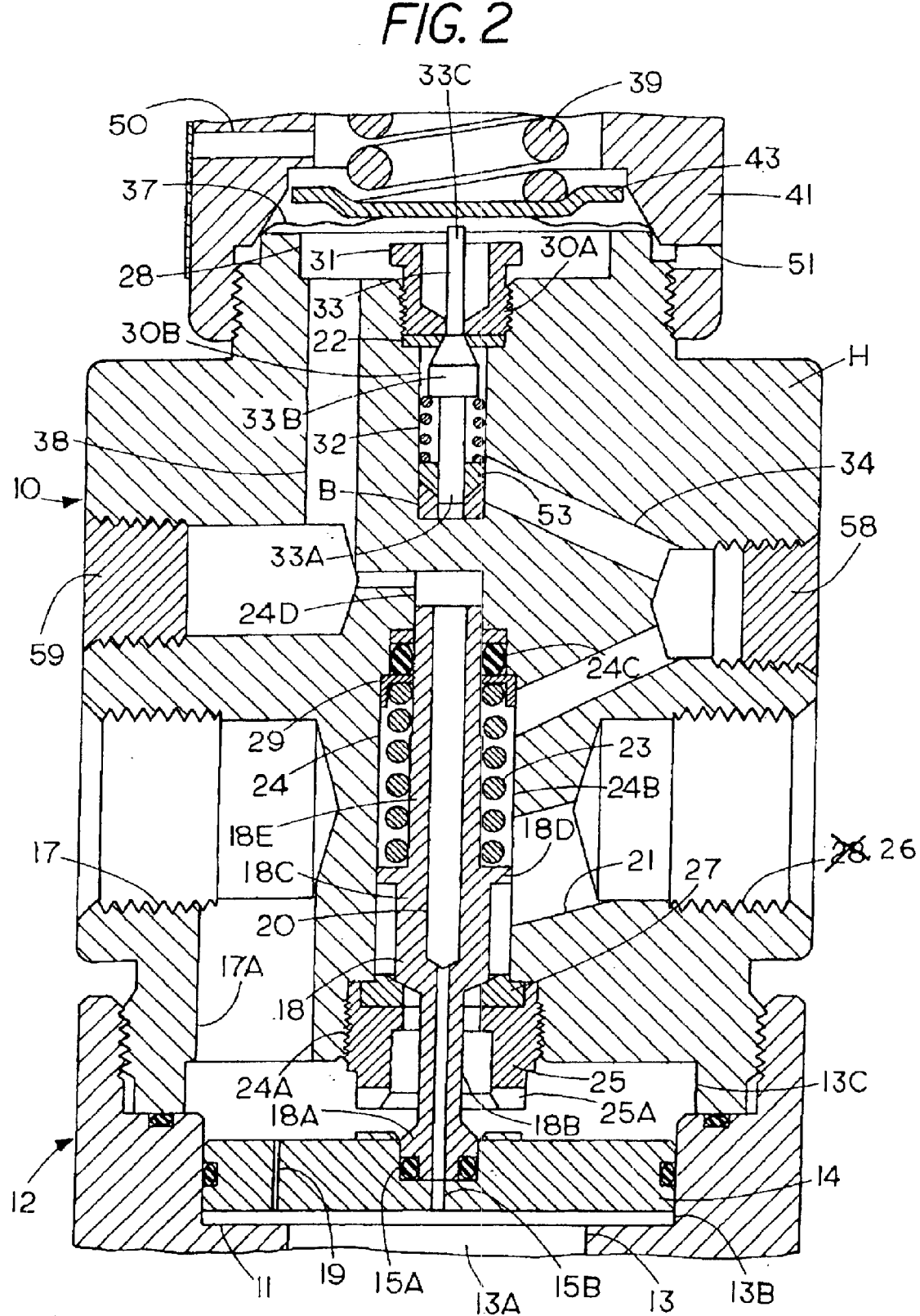
FIG. 2 is an enlarged cross sectional view of a portion of the structure of FIG. 1.
Figure 3:
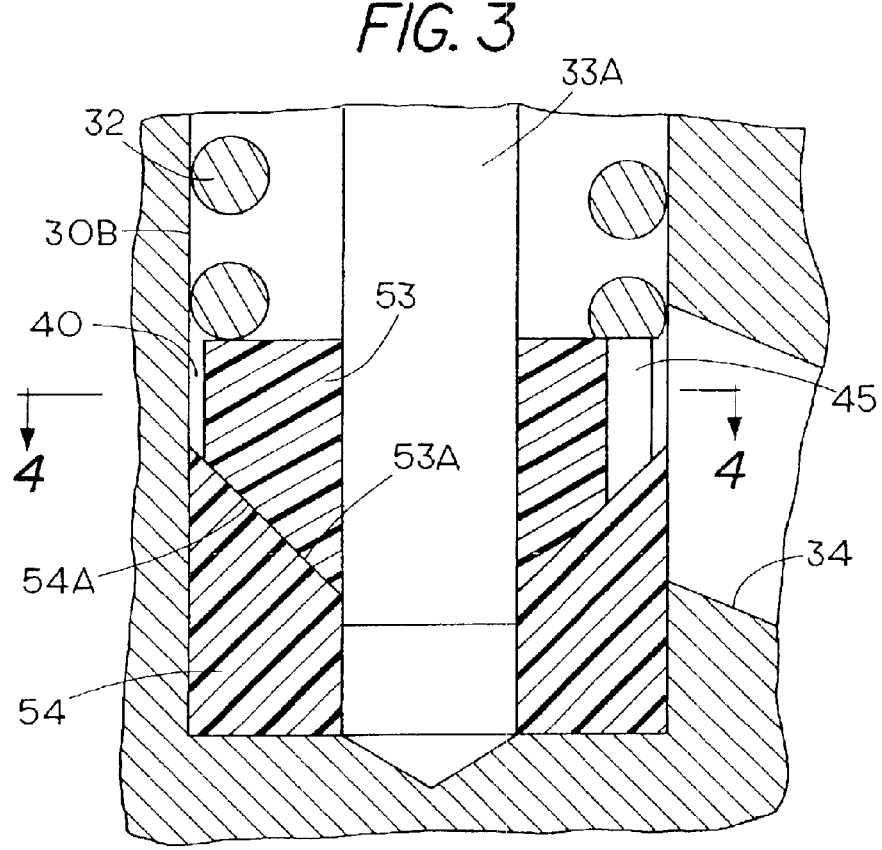
FIG. 3 is an enlarged, fragmentary cross sectional view of the mounting of the lower end portion of the pilot valve member.
Figure 4:
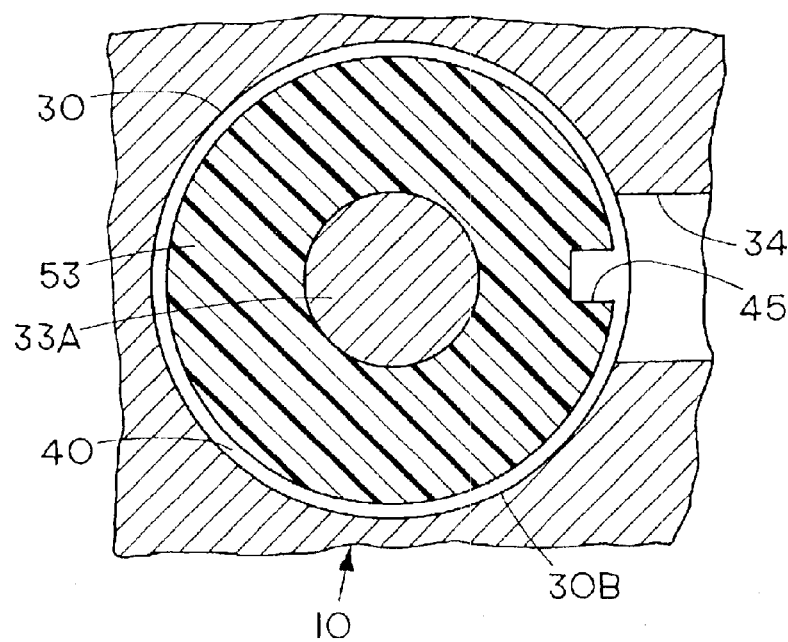
FIG. 4 is a fragmentary transverse cross sectional view that is generally taken along the line and in the direction of the arrows 4—4 of FIG. 3.

Referring to FIGS. 1 and 2 of the drawings, the internally piloted dome loaded high flow pressure regulator apparatus of this invention includes a regulator housing H having a regulator body, generally designated 10, that in conjunction with a dome, generally designated 12, threaded thereto defines a control chamber 13. An O-ring is provided between the regulator body and the dome. The control chamber includes a bottom portion 13A opening to a larger diameter axial intermediate chamber portion 13B to provide an annular shoulder 11. The intermediate chamber portion opens to a further enlarged top chamber portion 13C that in part is defined by the regulator body. The regulator body has a low pressure outlet 17 that is fluidly connected by a bore 17A to the top of the control chamber.

Axially movable in the chamber portion 13B and in fluid sealing relationship with the cylindrical dome wall portion that defines the intermediate chamber portion is a piston 14. The piston has a bleed hole 19 to permit constant fluid flow from the bottom chamber portion 13A to the top chamber portion 13C. The piston has a transversely centered aperture 15 extending axially therethrough. An enlarged diametric, lower part 18A of the main valve stem (member) 18 is mounted in the upper enlarged diametric part 15A of the aperture 15 in fluid sealing relationship with the wall defining part of the aperture and is abuttable against the shoulder formed by the juncture of part 15A with the reduced diameter part 15B of the aperture 15 that opens to the chamber portion 13A. The valve stem has a bore 20 extending axially therethrough and opening to the lower reduced diameter part 15B of the piston aperture.

The lower part of the regulator body has an axially elongated body main valve bore 24, the lower enlarged diametric part 24A of the bore 24 having an annular seat mount 25 threaded therein to retain the valve seat 27 in abutting relationship to the annular shoulder formed at the juncture of the enlarged diametric part 24A with the axial intermediate part 24B of the body bore 24. The regulator body has a high pressure inlet 26 opening through a bore 21 to the body bore portion 24B. The minimum inner diameters of the valve seat, the seat mount and the piston enlarged diametric bore portion and the outer diameter of the bottom part 18A of the main valve stem are substantially the same and thus provide a balanced main valve to reduce or eliminate the effects of inlet pressure changes on the outlet pressure.

The main valve stem includes an axially elongated, reduced outer diameter portion 18B that at its lower end is joined to the stem lower enlarged diametric portion 18A and at its upper end is joined to the larger diameter portion 18C which is of a larger diameter than the inner diameter of the valve seat. The juncture of the portions 18B, 18C is of a frustoconical or annular rounded shape for seating against the main valve seat to block fluid flow therethrough (main valve closed position) while the outer diameter of stem portion 18B is much less than the inner diameter of the main valve seat and is extendable through the valve seat. The larger diameter portion 18C at its top is joined to a further enlarged diametric flange 18D which forms a close axial slidable fit with the body bore portion 24B other than at the opening of bore 21 to bore 24. With reference thereto, the bore 21 opens to the axially opposite surfaces of the flange in each of the valve stem 18 open and closed positions. The main valve stem top portion 18E is axially elongated, of a smaller diameter than the stem flange and is axially slidably extended through a spring retainer 29 and an O-ring which forms a fluid seal between the main valve stem and the main body bore portion 24C. Bore portion 24C is of a smaller diameter than bore portion 24B but of a larger diameter than the top portion 24D of the body main bore 24 to which it opens. The spring retainer abuts against the annular shoulder formed by the opening of the bore portion 24C to bore portion 24D. A coil spring 23 extends between the spring retainer and the main valve stem flange to resiliently urge the valve stem 18 to a main valve closed position. Further, the coil spring 23 prevents the main valve member moving sufficiently in an opening direction to prevent fluid flow between the bore 20 and the fluid passage 38 whereby the pilot chamber 28 is always in fluid communication with control chamber bottom portion 13A.

The maximum movement of the piston in a main valve closing direction is limited by the piston abutting against the shoulder 11, provided it is not previously limited by abutting against the valve seat 25, the valve stem being maintained in fluid sealing engagement with the piston. The movement of the piston in the opposite axial direction (main valve opening direction) is limited by abutting against the main valve seat mount, there being transverse grooves 25A in the main valve seat mount to permit fluid flow from the inlet, through the body main bore, including through the main valve seat, and to the outlet even when the piston abuts against the main valve seat mount.

The upper part of the regulator body has a top opening pilot chamber 28, a pilot bore B that includes an axial intermediate bore portion 30A of a smaller diameter than that of the pilot chamber and of a larger diameter than the lower reduced diameter bore portion 30B to which it opens. An annular valve seat mount 31 is threadedly extended into bore portion 30A to clamp a valve seat 22 against the shoulder formed at the opening of bore portion 30B to bore portion 30A.

A pilot valve member (pilot valve stem) 33 extends within bore portion 30B and has an upper end portion 33C extending up through the valve seat to abut against the diaphragm 37, there being a coil spring 32 in bore portion 30B acting between a top valve member guide 53 and the enlarged diametric portion 33B of the valve member 33 to resiliently retain the valve member in a closed position with the enlarged diametric portion abutting against the valve seat 22 to block fluid flow through the valve seat to the pilot chamber 28. The maximum diameter of enlarged diametric portion 33B is greater than the maximum diameter of each of the pilot valve stem portions 33A, 33C. Located between the top guide 53 and the bottom part of bore portion 30B is a bottom guide 54, the bottom guide being of an outer diameter forming a close, axially movable fit with the wall defining bore portion 30B and of an inner diameter to have the lower end portion 33A of the pilot valve member axially movably extended therein. The guides are axially movable in the pilot bore. The upper guide 53 is of a smaller outer diameter than the diameter of bore portion 30B to provide an annular clearance space 40 therebetween. The guides 53, 54, which advantageously are made of plastic, have adjacent mating chamfered surfaces 53A, 54A. The spring 32 in abutting against the top guide forces the top guide downwardly whereby, as a result of the chamfered surfaces of the guides, the top guide applies a tight friction fit with the valve member portion 33A and in acting against the top guide, resiliently retains the bottom guide in abutting relationship to the lower part of the pilot bore. The guides minimize or prevent the pilot valve member bouncing as the result of flexing of the diaphragm with the variance of the pressure in the pilot chamber and thus serves to dampen vibrations of the diaphragm.

A fluid passageway 34 fluidly connects the main bore portion 24B to the clearance space in bore portion 30B such that pressurized fluid from the inlet can flow to the pilot chamber 28 when the pilot valve member 33 is in an open position and block such flow when the valve member is in its closed position. The guide 53 has an axial slot 45 that opens to the clearance space 40 and through the top surface of guide 53 to allow greater fluid flow from the passage 34 to a location above the top guide than would be allowed without such a slot.

The housing H also includes a regulator cap 41 that is threadedly connected to the top portion of the regulator body to clamp a diaphragm 37 therebetween for separating the pilot chamber 28 from the cap chamber 42. The cap has a vent aperture 50 opening to the cap chamber and a vent aperture 51 opening to the regulator body below the diaphragm but not in fluid communication with the pilot chamber 28. A load spring 39 acts between the diaphragm plate 43 and the spring button 44, the diaphragm plate being in abutting relationship to the diaphragm opposite the pilot valve member. A control knob 48 is keyed to an adjustment screw 47 which is threadedly mounted to the cap to in turn abut against the spring button whereby, upon rotating the control knob, the degree of compression of the load spring can be selectively varied to vary the outlet pressure. The load spring can be replaced with a load spring having different spring characteristics for being able to adjust the range of outlet pressures than that provided by rotating the control knob 48.

With the pilot and main valves closed, when the outlet pressure drops below a preselected level, the pressure in the control chamber bottom portion 13A continuously decreases as a result of the provision of the bleed hole 19. The pressure in the pilot chamber 28 drops as a result of it being in fluid communication with the chamber bottom portion 13A through the main valve member bore 20, bore portion 24D and the passage 38. With the lowering of the pressure in the pilot chamber, the diaphragm deflects (flexes) to move the pivot valve member 33 away from its closed position. The degree of opening depends upon the degree the pressure at the outlet falls below the preselected level. A transverse slot (not shown) is provided in the top edge portion of the valve seat mount 31 in order to permit fluid flow through the valve seat mount even if the diaphragm bottoms out against the top annular edge of the mount 31.

With the pilot valve member opening, high pressure fluid flows from the inlet, through the pilot chamber 28 and the main valve member bore 20 to the bottom control chamber portion 13A. The resulting increase of pressure in chamber portion 13A forces the piston upwardly. This results in the main valve member 18 moving to allow high pressure flow from the inlet, through the valve seat 27 to the top control chamber portion 13C and thence to the outlet. If the outlet pressure builds up above a preselected level, the piston is forced downwardly to allow the main valve member moving downwardly by the pressure in the top control chamber portion to decrease the high pressure fluid flow from the inlet, through the main valve seat 27 and to the control chamber top portion. This allows the spring 23 to move the main valve member toward its closed position and thus decreases or blocks the flow from the inlet, through valve seat 27 and to the top control chamber portion 13C.

Since the minimum diameter of the bleed hole 19 is many time smaller than the diameter of each the valve member bore 20, piston bore portion 15B and the passage 38 connecting bore portion 24D to the pilot chamber 28 and/or the diameter of the pilot valve seat 22 is many times smaller than the main valve seat 27, pressures builds up sufficiently in the pilot chamber to deflect the diaphragm to allow the pilot valve member 33 moving toward its closed position, if not to its closed position.

The fluid passageway 38 in fluidly connecting the pilot chamber 28 to the top part of main bore portion 24D permits fluid flow from the pilot chamber to bore portion 24D, even when the piston has moved to abut against the main valve seat mount 25. As a result, the pressurized fluid in the pilot chamber is able to be constantly vented through the passage 38, the main valve member bore 20 and the piston bore 15 to the control chamber bottom portion and thence through the piston bleed hole 19 to be vented through the outlet downstream of the main flow from the inlet and through the main valve seat 27 to the outlet. In the event the pressure in the control chamber bottom portion 13A builds up above that of the combination of spring force of spring 23 and the pressure in the top chamber portion, the piston moves the main valve member to an open position until the pressure in the top chamber builds up sufficiently.

One important feature of this venting from the pilot chamber is that in the event the control knob 48 is turned to decrease the pressure at the outlet, the pressure in the pilot chamber has to be allowed to decrease, and this can take place by venting in the above mentioned manner. Further, with constant fluid flow through the piston bleed hole, the hysteresis is minimized when there is constant fluid flow from the outlet to the inlet which provides greater stabilization of outlet pressure. Additionally, with the provision of the pilot bore 30 and pilot valve stem 33 in the regulator body together with the passage 34 constantly being in fluid communication with the inlet and the pilot chamber being in constant fluid communication with the outlet as a result of the fluid flow path within the regulator body through passage 38 and 20 and the bleed hole, no external plumbing is required to provide pilot regulation. Since there is no external plumbing, the pilot regulation and the dome loaded supply regulation of this invention being in one regulator body, the number of leakage paths is minimized. It is noted that the regulator body is made of a single unitary piece of material, other than for plugs 58 and 59 plugging the ends of apertures made during the making of passages 34 and 38 respectively.

What is claimed is:

1. A pilot dome loaded regulator, comprising a regulator housing having a high pressure inlet, a low pressure outlet, a control chamber, a pilot chamber, a main valve bore having the inlet opening thereto and opening to the control chamber, a pilot valve bore opening to the pilot chamber, and a first fluid passage opening to the main valve bore and to the pilot valve bore, a pilot valve mounted by the regulator body to extend in the pilot bore and operable between a closed position and an open position for controlling fluid flow from the first passage to the pilot chamber, flexible diaphragm means mounted by the housing for, upon a decrease of pressure in the pilot chamber, flex to operate the pilot valve member to an open position to permit fluid flow from the first passage to the pilot chamber and upon sufficient increase of pressure in the pilot chamber, flex whereby the pilot valve returns to its closed position, a main valve mounted by the regulator body to extend in the main valve bore and operable between a closed position and an open position for controlling fluid flow from the main valve bore to the control chamber, a piston movably mounted in the control chamber for dividing the control chamber into a first chamber portion and a second chamber portion and operating the main valve between a closed position and an opened position, the first chamber portion opening to the outlet, and at least one of the housing, the combination of the housing and piston and the combination of the housing, main valve and the piston having a second passage for fluidly connecting the pilot chamber to the control chamber second portion for applying fluid under pressure from the pilot chamber to the control chamber second portion to move the piston and therethrough operate the main valve to its open position when the pressure at the outlet falls below a preselected level, the second fluid passage including a piston bore extending through the piston and opening to the main valve bore remote from the openings of the inlet and the first passage to the main valve bore, the main valve in its open position permitting fluid flow from the inlet and through the main valve bore to the first chamber portion.

2. The pilot dome loaded regulator of claim 1 wherein the valve stem abuts against the piston and the piston has a bleed aperture that extends axially through the piston, is of a smaller minimum diameter than the minimum diameter of the piston bore and is spaced from the piston bore.

3. A pilot dome loaded regulator, comprising a regulator housing having a high pressure inlet, a low pressure outlet, a control chamber, a pilot chamber, a main valve bore having the inlet opening thereto and opening to the control chamber, a pilot valve bore opening to the pilot chamber, a first fluid passage opening to the pilot valve bore and to the main valve bore remote from the opening of the inlet to the main valve bore, a pilot valve mounted by the regulator body to extend in the pilot bore and operable between a closed position and an open position for controlling fluid flow from the first passage to the pilot chamber, flexible diaphragm means mounted by the housing for, upon a decrease of pressure in the pilot chamber, flex to operate the pilot valve member to an open position to permit fluid flow from the first passage to the pilot chamber and, upon sufficient increase of pressure in the pilot chamber, flex whereby the pilot valve returns to its closed position, a main valve mounted by the regulator body to extend in the main valve bore and operable between a closed position and an open position for controlling fluid flow from the main valve bore to the control chamber, a piston movably mounted in the control chamber for dividing the control chamber into a first chamber portion and a second chamber portion and operating the main valve between closed and opened positions, the first chamber portion opening to the outlet, at least one of the housing and the combination of the main valve and the piston having a second passage for fluidly connecting the pilot chamber to the control chamber second portion for applying fluid pressure to move the piston and therethrough operate the main valve to its open position when the pressure at the outlet falls below a preselected level, the main valve in its open position permitting fluid flow from the inlet and through the main valve bore to the first chamber portion and the piston having a bleed hole to permit fluid flow from second chamber portion to the first chamber portion, each of the main valve and pilot valve including a valve seat, a valve member movable relative to the valve seat between the valve opened and closed positions, and resilient means for urging the valve member to the valve closed position and the piston having a bore extending therethrough that forms a part of the second passage.

4. A piloted dome loaded regulator, comprising an axially elongated regulator body having an upper end portion that includes an upwardly opening pilot chamber and a lower end portion, a dome mounted to the regulator body to, in conjunction therewith, have a control chamber, a regulator cap mounted to the regulator body and having a cap chamber open fling toward the pilot chamber, a diaphragm mounted by at least one of the regulator body and the cap to separate the pilot chamber from the cap chamber, adjustment means for exerting an axial downward force on the diaphragm to selectively deflect the diaphragm, the regulator body having a high pressure inlet, a low pressure outlet, a main bore having a lower end opening to the control chamber, an opposite end portion and an intermediate portion and a pilot bore having an upper end portion opening to the pilot chamber and an opposite end portion, a main valve seat mounted in a fluid flow path between the main bore lower end and intermediate portions, a main valve member extending within the main bore and through the main valve seat for movement between a closed position for blocking fluid flow from the inlet to the control chamber and an open position permitting fluid flow from the inlet to the control chamber, the control chamber having a top portion opening to the outlet and a bottom portion, a piston mounted in one of the control chamber portions chamber portion for axial upward and downward movement between main valve members open and closed positions, said piston having an aperture extending therethrough to open to the top chamber and the bottom chamber portions and being of a much larger diameter than the inner diameter of the main valve seat, the main valve member having a lower end portion extending within the control chamber top portion in abutting relationship to the piston for moving the main valve member toward the main member open position as the piston valve member moves upwardly in the control chamber, the main valve member having a first fluid passage for fluidly connecting the piston aperture to the main bore opposite end portion, the regulator body having a second fluid passage for fluidly connecting the main bore intermediate end portion to the inlet and to the pilot bore and a third passage for fluidly connecting the main valve opposite end portion to the pilot chamber in spaced relationship to the opening of the pilot bore to the pilot chamber, a pilot valve seat mounted in a fluid flow path between the pilot bore upper end and main valve intermediate portions, a pilot valve member extending within the pilot bore and through the pilot valve seat for movem nt betwe n a closed position for blocking fluid flow from the pilot bor opposite end portion to the pilot chamber and an op n position p rmitting fluid flow from the pilot bor opposite end portion to the pilot chamber, the pilot valve member being movable by the deflection of the diaphragm resulting from the decrease of fluid pressure in the pilot chamber to move the pilot valve member from its closed position, first resilient means for urging the pilot valve member to its closed position and second resilient means for urging the main valve member to its closed position.

5. A piloted dome loaded regulator of claim 4 wherein the main valve seat is of a larger inner diameter than the inner diameter of the pilot valve seat.

6. A piloted dome loaded regulator of claim 4 wherein the second passage opens to the pilot bore opposite end portion, the pilot valve member includes an enlarged diametric portion abuttable against the pilot valve seat for blocking fluid flow therethrough and an reduced diameter end portion in the pilot bore opposite end portion, a first guide member is mounted in the pilot bore adjacent to the opening of the second passage to the pilot bore and having the pilot valve member reduced diameter end portion slidably extended therein, a second guide member mounted in the pilot bore opposite end portion and having the pilot valve member reduced diameter end portion slidably extended therein, being between the pilot valve member enlarged diametric portion and the first guide member, the first and second guide members having chamfered surfaces that when a downward force is exerted on the first guide, the first guide member frictionally engages the pilot valve member opposite end portion, the first resilient means acting between the pilot valve member enlarged diametric portion and the first guide member to resiliently urge the first guide member downwardly.

7. A piloted dome loaded regulator claim 4 wherein the piston has a top surface and a bottom surface and a bleed hole opening through the top surface and the bottom surface in spaced relationship to the piston aperture and being of a smaller diameter than the minimum diameter of the piston aperture.

8. A piloted dome load d regulator of claim 7 wherein the control chamber top portion is of a larger diameter than the control chamber bottom portion to provide a shoulder limiting the movement of the piston in a main valve member opening direction.

9. A piloted dome loaded regulator of claim 8 wherein the piston aperture has an enlarged diametric portion opening through the top surface and a reduced diametric portion opening through the piston bottom surface and the main valve stem has a lower end portion in the piston aperture enlarged diametric portion in fluid sealing relationship therewith and in fluid communication with the piston aperture reduced diameter portion.

10. A pilot dome loaded regulator of claim 9 wherein the main valve stem lower end portion is of a diameter about the same as the main valve seat inner diameter and is exposed to the fluid pressure in the control chamber top portion.

11. A pilot dome loaded regulator of claim 10 wherein the main valve stem has a flange of a diameter to form a close sliding fit with the main bore intermediate portion and has top and bottom surfaces with the second passage being in fluid communication with both of the flange surfaces in each of the main valve open and closed positions.

12. A pilot dome loaded regulator, comprising a regulator housing having a high pressure inlet, a low pressure outlet, a control chamber, a pilot chamber, an axially elongated main valve bore having the inlet opening thereto and opening to the control chamber, the main valve bore having a first end and a second end, a pilot valve bore opening to the pilot chamber, and a first fluid passage opening to the main valve bore and to the pilot valve bore, a pilot valve mounted by the regulator body to extend in the pilot bore and operabl between a clos d position and an open position for controlling fluid flow from the first passage to the pilot chamber, flexible diaphragm means mo nted by the housing for, upon a decrease of pr ssure in th pilot chamber, fl x to operate the pilot valve member to an open position to permit fluid flow from the first passage to the pilot chamber and upon sufficient increase of pressure in the pilot chamber, flex whereby the pilot valve returns to its closed position, a main valve mounted by the regulator body to extend in the main valve bore and operable between a closed position and an open position for controlling fluid flow from the main valve bore to the control chamber, a piston movably mounted in the control chamber for dividing the control chamber into a first chamber portion and a second chamber portion and operating the main valve between a closed position and an opened position, the first chamber portion opening to the outlet, the combination of the housing, main valve and the piston having a second passage for fluidly connecting the pilot chamber to the control chamber second portion for applying fluid pressure to move the piston and therethrough operate the main valve to its open position when the pressure at the outlet falls below a preselected level, the second fluid passage opening to the main valve bore remote from the openings of the inlet and the first passage to the main valve bore, the main valve in its open position permitting fluid flow from the inlet and through the main valve bore to the first chamber portion, the main valve bore being axially elongated and having a first end and an axially opposite second end, the main valve being a balanced valve and including a valve seat, an axially elongated main valve member having an axial intermediate portion extending through the valve seat, a first end portion extending within the main bore first end and of a diameter substantially the same as the inner diameter of the valve seat and an axially opposite end portion in abutting relationship to the piston and the second passage including a housing passage portion opening to the pilot chamber and to the main bore first end portion.

13. A pilot dome loaded regulator of claim 12 wherein the pilot bore has a first end portion opening to the pilot chamber and an opposite end portion having the first passage opening thereto, the pilot valve includes a pilot valve seat and an axially elongated pilot valve member movable in the pilot bore between the pilot valve positions and having an intermediate portion abuttable against the pilot valve seat to block fluid flow from the first passage to the pilot chamber, a first end portion abuttable against the diaphragm means and an axially opposite second end portion, and a guide member mounted in the pilot bore adjacent to the opening of the first passage to the pilot bore and having the pilot valve member second end portion slidably extended therein.

14. A pilot dome loaded regulator, comprising a regulator housing having a high pressure inlet, a low pressure outlet, a control chamber, a pilot chamb r, an axially elongated main valve bor having the inlet opening thereto and opening to th control chamber, the main valve bore having a first end and a second nd, a pilot valve bore op ning, to the pilot chamber, and a first fluid passage op ning to the main valve bore and to the pilot valve bore, a pilot valve mounted by the regulator body to extend in the pilot bore and operable between a closed position and an open position for controlling fluid flow from the first passage to the pilot chamber, flexible diaphragm means mounted by the housing for, upon a decrease of pressure in the pilot chamber, flex to operate the pilot valve member to an open position to permit fluid flow from the first passage to the pilot chamber and upon sufficient increase of pressure in the pilot chamber, flex whereby the pilot valve returns to its closed position, a main valve mounted by the regulator body to extend in the main valve bore and operable between a closed position and an open position for controlling fluid flow from the main valve bore to the control chamber, a piston movably mounted in the control chamber for dividing the control chamber into a first chamber portion and a second chamber portion and operating the main valve between a closed position and an opened position, the first chamber portion opening to the outlet, the combination of the housing, main valve and the piston having a second passage for fluidly connecting the pilot chamber to the control chamber second portion for applying fluid pressure to move the piston and therethrough operate the main valve to its open position when the pressure at the outlet falls below a preselected level, the second fluid passage opening to the main valve bore remote from the openings of the inlet and the first passage to the main valve bore, the second passage including a piston bore extending axially through the piston, the main valve in its open position permitting fluid flow from the inlet and through the main valve bore to the first chamber portion, each of the main valve and pilot valve including a valve seat, a valve member movable relative to the valve seat between the valve opened and closed positions and resilient means for urging the valve member to the valve closed position and manually adjustable means for loading the diaphragm means to vary the pressure at the outlet, the main valve having a first end portion and a second nd portion and the second passage including a piston bor extending axially through the piston with the main valve member second end portion extending within the piston bore and a bore extending axially through the main valve member to open to the main valve bore first end portion and to the piston bore.

15. A pilot dome loaded regulator of claim 14 wherein the piston has a bleed hole extending axially therethrough and of a smaller minimum diameter than the minimum diameter of the piston bore, the piston is of a diameter many times greater than the maximum diameter of the main valve member and the minimum cross sectional area of the opening of the inlet to the main valve bore is many times greater than the minimum cross sectional area of the first passage.

16. A pilot dome loaded regulator, comprising a regulator housing having a high pressure inlet, a low pressure outlet, a control chamber, a pilot chamber, a main valve bore having the inlet opening thereto and opening to the control chamber, a pilot valve bore opening to the pilot chamber, a first fluid passage opening to the pilot valve bore and to the main valve bore remote from the opening of the inlet to the main valve bore, a pilot valve mounted by the regulator body to extend in the pilot bore and operable between a closed position and an open position for controlling fluid flow from the first passage to the pilot chamber, flexible diaphragm means mounted by the housing for, upon a decrease of pressure in the pilot chamber, flex to operate the pilot valve member to an open position to permit fluid flow from the first passage to the pilot chamber and, upon sufficient increase of pressure in the pilot chamber, flex whereby the pilot valve returns to its closed position, a main valve mounted by the regulator body to extend in the main valve bore and operable between a closed position and an open position for controlling fluid flow from the main valve bore to the control chamber, a piston movably mounted in the control chamber for dividing the control chamber into a first chamber portion and a second chamber portion and operating the main valve between closed and opened positions, the first chamber portion opening to the outlet, at least one of the housing and the combination of the main valve and the piston having a second passage for fluidly connecting the pilot chamber to the control chamber second portion for applying fluid pressure to move the piston and therethrough operate the main valve to its open position when the pressure at the outlet falls below a preselected level, the main valve in its open position permitting fluid flow from the inlet and through the main valve bore to the first chamber portion and the piston having a bleed hole to permit fluid flow from second chamber portion to the first chamber portion, each of th main valve and pilot valve including a valv seat, a valve member movable relativ to the valve seat between th valve op ned and closed positions, and resilient means for urging the valve memb r to the valve clos d position and the piston has a bore extending axially therethrough that forms a part of the second passage.

* * * * *